United States Patent
Sychta

(10) Patent No.: US 7,308,289 B2
(45) Date of Patent: Dec. 11, 2007

(54) METHOD AND SYSTEM FOR MANAGING IN-VEHICLE TELEPHONY

(75) Inventor: Brian V. Sychta, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 260 days.

(21) Appl. No.: 10/691,807

(22) Filed: Oct. 22, 2003

(65) Prior Publication Data

US 2004/0151285 A1     Aug. 5, 2004

Related U.S. Application Data

(60) Provisional application No. 60/444,343, filed on Jan. 30, 2003.

(51) Int. Cl.
*H04M 1/00*     (2006.01)

(52) U.S. Cl. .............. 455/569.1; 455/569.2; 455/575.9; 455/297

(58) Field of Classification Search .. 455/569.1–569.2, 455/99, 41, 297, 575.9; 701/1, 36, 211
See application file for complete search history.

(56) References Cited

U.S. PATENT DOCUMENTS

| | | | | |
|---|---|---|---|---|
| 5,316,636 A | * | 5/1994 | Bunshah et al. | 204/157.47 |
| 5,418,836 A | * | 5/1995 | Yazaki | 455/569.2 |
| 6,718,187 B1 | * | 4/2004 | Takagi et al. | 455/569.2 |
| 6,792,296 B1 | * | 9/2004 | Van Bosch | 455/569.2 |
| 2002/0111715 A1 | * | 8/2002 | Richard | 701/1 |
| 2003/0032460 A1 | * | 2/2003 | Cannon et al. | 455/569 |
| 2003/0119566 A1 | * | 6/2003 | Chen | 455/569 |
| 2003/0186686 A1 | * | 10/2003 | Yang et al. | 455/414.1 |

FOREIGN PATENT DOCUMENTS

| | | |
|---|---|---|
| DE | 10045303 C2 | 4/2003 |
| WO | WO 99/49681 A1 | 9/1999 |
| WO | WO 01/47225 A2 | 6/2001 |
| WO | WO 01/93545 A2 | 12/2001 |

* cited by examiner

*Primary Examiner*—Duc M. Nguyen
*Assistant Examiner*—Dai Phuong

(57) ABSTRACT

A technique for processing telephone calls from a plurality of telephone sources in a vehicle audio system suitably includes providing a first call using a first one of the telephone sources to a user via the vehicle audio system, notifying the user of a second call received via a second one of the telephone sources while the first call is active, and processing an instruction from the user to either suspend the first call and accept the second call or to continue providing the first call. The technique may be implemented in a vehicle audio system that includes an onboard telephone, and may be adapted to work with wireless or other portable telephones carried by drivers and passengers in the vehicle.

21 Claims, 3 Drawing Sheets

METHOD AND SYSTEM FOR MANAGING IN-VEHICLE TELEPHONY

PRIORITY INFORMATION

Figure 1:
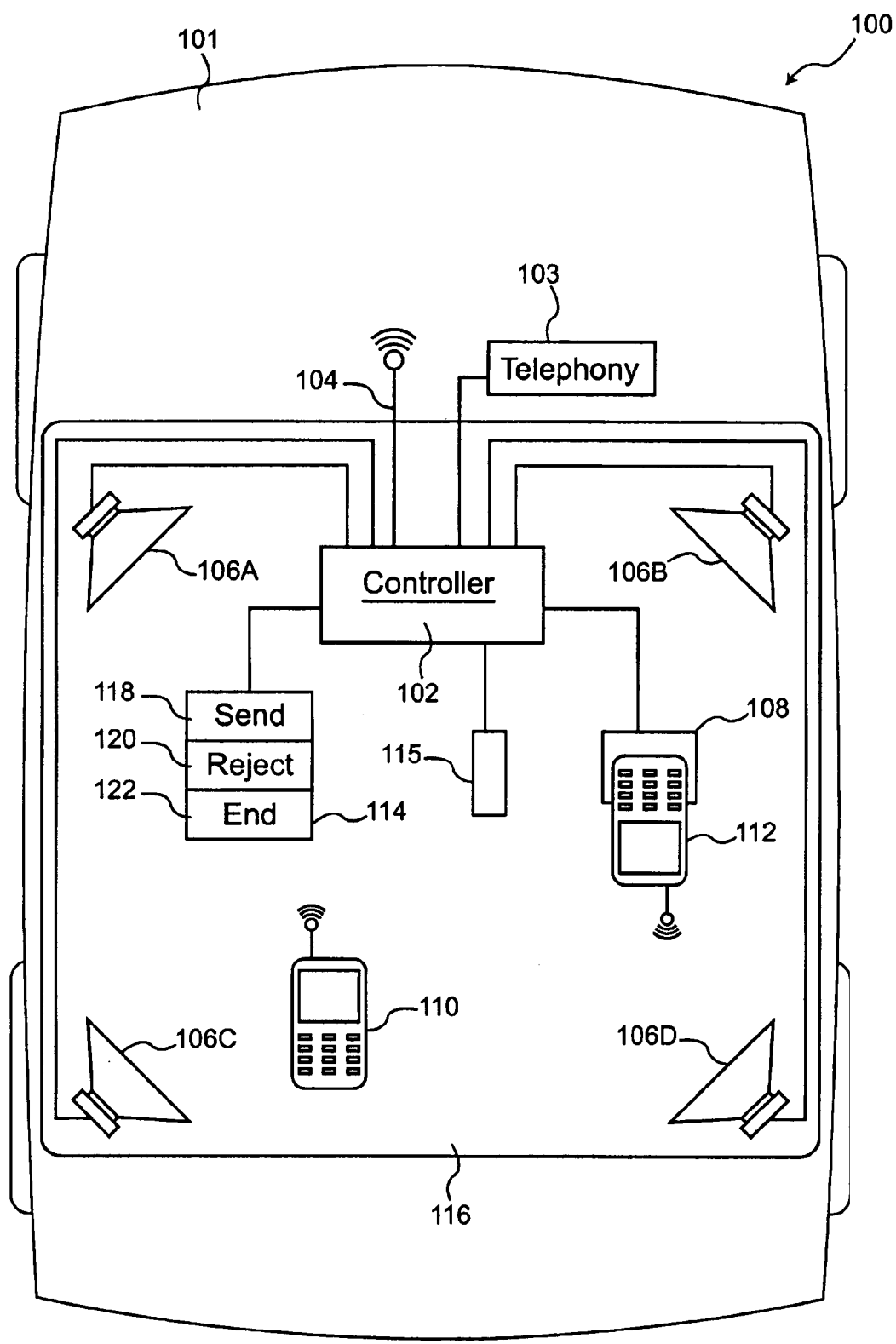

This application claims priority to U.S. Provisional Application Ser. No. 60/444,343, entitled "Method and System for Managing In-Vehicle Telephony", which was filed on Jan. 30, 2003.

FIELD OF THE INVENTION

The present invention generally relates to vehicle audio systems, and more particularly relates to management of telephone calls from multiple sources in a vehicle audio system.

BACKGROUND OF THE INVENTION

To meet customer demands for safety, security and convenience, many vehicles such as automobiles are increasingly becoming available with the capability to make "hands free" cellular/wireless telephone calls using a vehicle audio system. Such systems typically use the vehicle audio speakers to play telephone audio, and use a microphone to pick up voices in the passenger cabin, thereby leaving the driver's hands free to maneuver the vehicle. One type of vehicle telephony system is the ONSTAR service available from General Motors Corporation, which provides a telephony system that is built into the vehicle at the factory. ONSTAR telephony can be used to safely make telephone calls, to obtain emergency assistance, and/or to obtain directions or other information while the vehicle is in operation.

Although on-board telephone systems such as the ONSTAR system have proven to be quite useful and convenient, many drivers and passengers nowadays carry their own personal wireless phones even when they are away from their vehicles. For many users, the portable wireless phone is a primary mode of contact, thereby requiring the user to have access to the phone at all times, including when the user is operating or riding in a vehicle. If a user receives a call on a wireless phone while driving, however, that person may focus his or her attention on using the phone for the duration of the call, thereby resulting in reduced attention to operating the vehicle. Moreover, if a person receives a call on one phone (e.g., a portable wireless phone) while talking on a call received or placed via another phone (e.g., the onboard telephony system), even more distraction can take place as the user either attempts to handle both calls simultaneously or ignores one of the calls while processing the other manually. This problem is worsened if multiple passengers are riding in the vehicle, each with their own portable phones.

More recently, techniques have been developed that allow users to answer and originate telephone calls using their personal handheld phones through the vehicle's audio system. Although these systems allow wireless calls to be handled in a "hands free" manner without distracting the driver, typically only one phone is allowed access to the vehicle audio system at any time.

Accordingly, it is desirable to create a technique that allows multiple phones to share access to the vehicle audio system. In addition, it is desirable to create a vehicle audio system capable of safely processing multiple simultaneous calls via multiple telephones. Furthermore, other desirable features and characteristics of the present invention will become apparent from the subsequent detailed description and the appended claims, taken in conjunction with the accompanying drawings and this background of the invention.

BRIEF SUMMARY OF THE INVENTION

According to various embodiments, systems and methods for processing telephone calls from multiple phones through a vehicle audio system are provided. The multi-phone processing techniques may be implemented in vehicles that include onboard telephones, and may be adapted to work with handheld wireless telephones carried by drivers and passengers in the vehicle. Handheld phones may connect to the vehicle audio system using a wireless connection and/or through a hardware interface such as a cradle.

A technique for processing telephone calls from multiple telephone sources in a vehicle audio system suitably includes providing a first call using a first one of the telephone sources to a user via the vehicle audio system, notifying the user of a second call received via a second telephone source while the first call is active, and processing an instruction from the user to either suspend the first call and accept the second call through the vehicle audio system or to continue providing the first call through the vehicle audio system.

An audio system for processing telephone calls from multiple phones in a vehicle suitably includes at least one audio speaker, a user interface and a controller having an interface to each of the telephones. The controller is programmed or otherwise configured to provide a first call from one of the phones to a user via the vehicle audio system, to notify the user of a second call received via a second telephone while the first call is active, and to process an instruction received from the user at the user interface to either suspend the first call and accept the second call over the at vehicle audio system, or to continue providing the first call over the vehicle audio system as appropriate.

BRIEF DESCRIPTION OF THE DRAWING FIGURES

Figure 2:
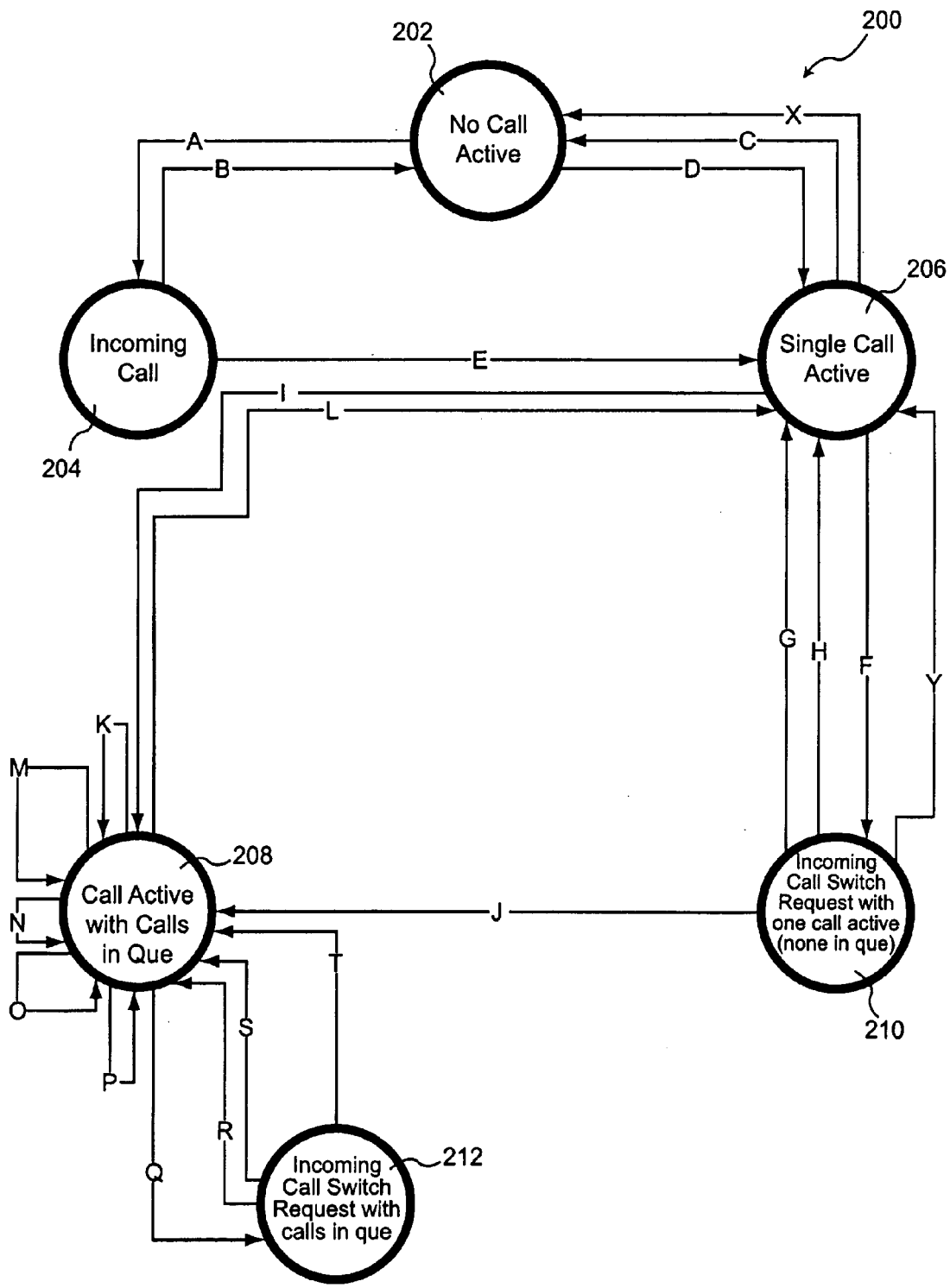
Figure 3:
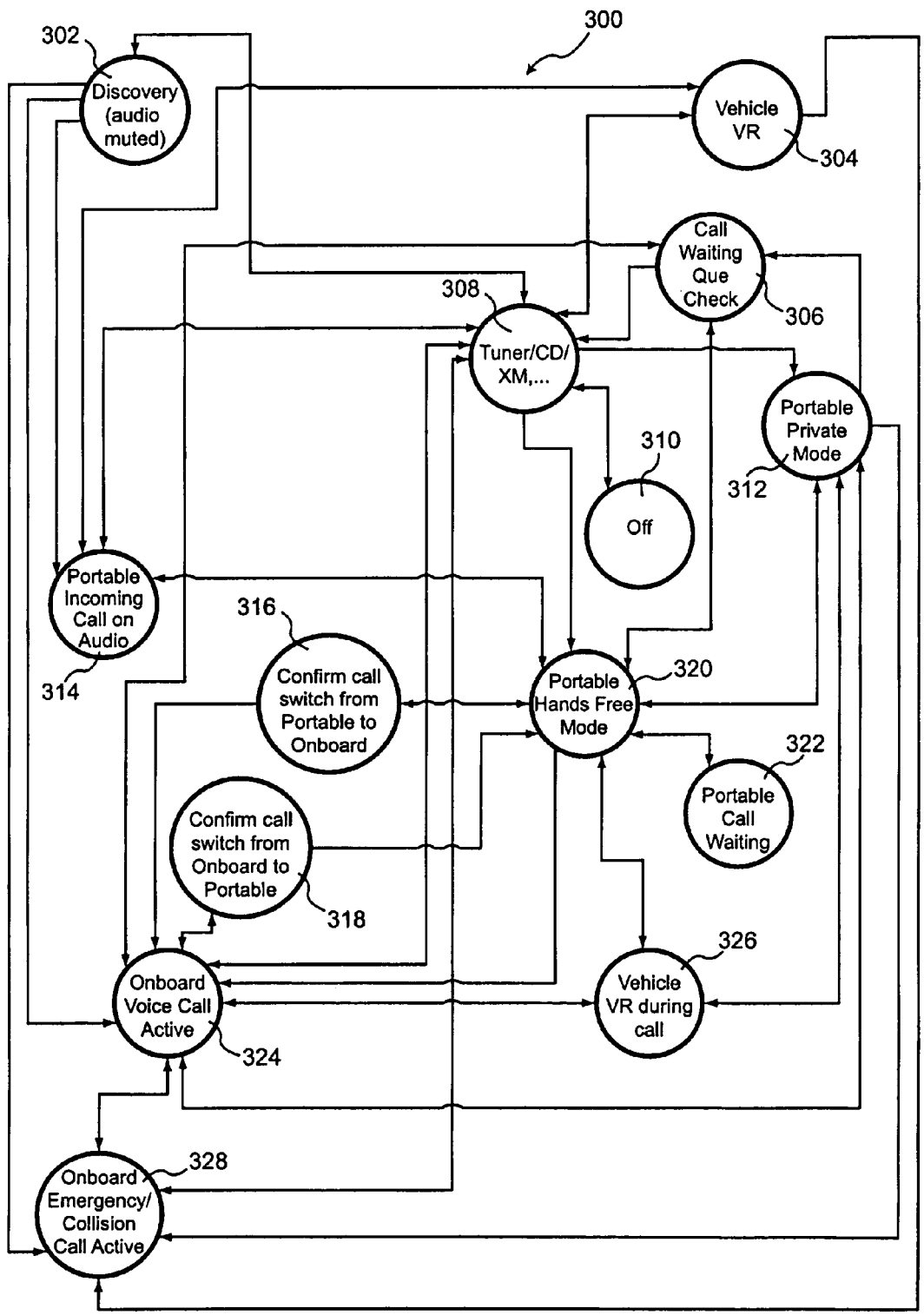

Various exemplary embodiments of the present invention will hereinafter be described in conjunction with the following drawing figures, wherein like numerals denote like elements, and FIG. 1 is a block diagram of an exemplary vehicle audio system that supports in-vehicle telephony from multiple sources;

FIG. 2 is a state diagram of an exemplary process for handling in-vehicle telephony through a vehicle audio system; and FIG. 3 is a state diagram of an exemplary system for handling in-vehicle telephone through a vehicle audio system.

DETAILED DESCRIPTION OF EXEMPLARY EMBODIMENTS

The following detailed description is exemplary in nature and is not intended to limit the invention or the application and uses of the invention. Furthermore, there is no intention to be bound by any theory presented in the preceding background of the invention or the following detailed description of the drawings.

According to various embodiments of the invention, a technique for handling telephone calls from multiple sources is implemented within a vehicle audio system. The system suitably communicates with the various telephones present within the vehicle (e.g. onboard telephones, portable wireless phones, phones inserted into a cradle, etc.) to process incoming and outgoing calls over the various phones in an efficient manner. Moreover, various embodiments of the system use intuitive user interfaces that allow users to answer, reject and end calls as well as place calls on hold with minimal distraction to the driver.

With reference now to FIG. 1, an exemplary audio system 100 for the passenger compartment 116 of a vehicle 101 suitably includes a controller 102, a user interface 114, and one or more audio speakers 106A-D. Audio system 100 also includes any number of interfaces to various telephones operating within the vehicle. An antenna 104, for example, may provide a wireless interface between controller 102 and a wireless phone 110 that supports any short-range wireless communications scheme such as the BLUETOOTH standard or the like. Alternatively or additionally, a cradle 108 or other physical interface such as a cable or other connector may be provided to physically accept a wireless phone 112 for communication with controller 102.

Controller 102 is any head unit, processor or other device capable of processing telephone calls and other audio data within system 100. In an exemplary embodiment, controller 102 is a conventional head unit that may be mounted in a dashboard or other convenient location within vehicle 101 as appropriate. As such, controller 102 typically includes components and interfaces for controlling the various conventional audio/visual functions available to users of vehicle 101, including radio, satellite radio, compact disk, cassette, digital video disk (DVD), television and/or the like. In an exemplary embodiment, controller 102 includes a conventional microprocessor or microcontroller capable of executing programming instructions stored within a digital memory or other storage device to process the various audio/visual signals as directed by the user.

Controller 102 may also include a wireless receiver for processing short-range wireless signals received via antenna 104. In an exemplary embodiment, controller 102 includes an implementation of a BLUETOOTH transceiver that is capable of communicating with a Bluetooth-enabled telephone 110 within passenger compartment 116. The Bluetooth standard is described, for example, in the Bluetooth Specification v.1.1 dated Feb. 2, 2001 and available from the Bluetooth Special Interest Group (SIG). Equivalent embodiments may incorporate additional or alternate wireless technologies such as IrDA, HomeRF or the like, and/or may support other versions of the Bluetooth specifications. Controller 102 may also include an interface to an on-board wireless telephony system 103 such as an ONSTAR phone, a satellite phone, or the like that uses audio speakers 106A-D and a microphone 115 in passenger compartment 116 to process phone calls over audio system 100. Any presently-known or subsequently developed wireless and/or telephone technologies may be used with alternate but equivalent embodiments.

Interface 114 is any keyboard, touchpad, button(s) or other interface capable of receiving inputs from a driver, passenger or other user of vehicle 100. In an exemplary embodiment, interface 114 includes a collection of buttons 118, 120, 122 for operating the on-board telephony features of system 100. The various buttons may be located on the steering wheel of the vehicle, for example, or may be conveniently located on the dashboard, in a vehicle console, on head unit/controller 102, or in any other location in passenger compartment 116. In an alternate embodiment, interface 114 is not physically present in passenger compartment 116, but rather represents one or more logical inputs that may be voice-activated or otherwise triggered without requiring manual depression by the user. In an exemplary embodiment, interface 114 suitably includes an "ANSWER/SEND" button 118, a "REJECT" button 120, and/or and "END" button 122. Of course the various labels and functions of the various keys, buttons or other inputs to interface 114 may vary widely from embodiment to embodiment.

In operation, controller 102 suitably receives and processes calls from one or more portable phones 110, 112 and/or from an onboard telephony system 103. Phone connections may be established via wireless links (using antenna 104), via hardware links (e.g. cradle 108) or the like. Phone audio is provided to the user via audio speakers 106A-D, with user voice data provided to controller 102 by microphone 115. In various embodiments, the various telephones 103, 110, 112 operating within vehicle 100 additionally provide phone status information (e.g. call active, call inactive, call incoming) to controller 102, as well as optional call priority data (based upon caller identification data, for example, as may be determined by the user) to controller 102 using any conventional technique. Users suitably manage calls received and sent via the various phones operating in system 100 using interface 114, as appropriate.

FIG. 2 is a state diagram showing the various states of a control routine for processing phone calls sent and received using a number of telephones within system 100. With reference now to FIG. 2, an exemplary process 200 suitably includes the broad steps of providing a first call to the user (state 206), notifying the user when a subsequent call arrives from another telephone (state 210), and processing an instruction from the user to either suspend the first call and accept the second call (state 208), or to continue providing the first call (state 210). Process 200 may be implemented, for example, with software instructions executing in controller 102 (FIG. 1) or another appropriate component in system 100.

Process 200 for handling phone calls from multiple telephones suitably begins with no active calls (state 202). In this state, the audio system may provide radio, music or other conventional audio content to the user until a phone call arrives from any of the phones 103, 110, 112 communication within system 100. As a call is received, the call is announced to the user with an audible alert such as a ring tone, voice alert, or the like (path "A"). System 100 may also provide caller ID or other information to the user with a vehicle display, audible announcement or the like. If the user rejects the call (e.g. by depressing "REJECT" button 120), processing is returned to initial state 202 (path "B") and conventional audio content may resume. If the user accepts the call (e.g. by depressing "ANSWER/SEND" button 118), processing passes to state 206 (path "E") to reflect that a single call is active. Alternatively, processing may enter state 206 from state 202 if the user originates a call on any connected phone (path "D"). As a call is activated, a command is sent to the appropriate phone to activate the call, audio from the phone is routed to the vehicle's audio system, and vehicle microphone output is routed to the phone's audio input. If the single call ends without additional calls being sent or received, processing returns once again to state 202 (path "C").

If a separate call is received via a different phone while the first call is still active, processing is passed to state 210 to reflect that a call switch request has arrived (path "F"). The user is notified of the second call (e.g. using an audible or visual alert), and the call is stored as an active incoming call. If the user rejects the new call (e.g. by depressing the "REJECT" button), the second call is dismissed by sending a command to the appropriate phone receiving the call (path "G"). If the user elects to end the first call and accept the second call (e.g. by depressing "END" button 122), the first call is dismissed by sending a command to the appropriate phone (path "H") and audio for the second call is routed between the phone and audio system 100. If the user elects to accept the second call (e.g. by depressing "SEND/ACCEPT" button 118), processing continues (path "J") by making the second call active within the vehicle's audio system, and the first call is placed into a queue (state 208). The first call may also be placed on "hold" if the phone and interface to controller 102 support such functionality. If the incoming call terminates or disconnects prior to any action by the user, processing suitably returns to state 206 as appropriate (path "Y").

Alternatively, a second incoming call may automatically supercede an existing call if the subsequent call is identified as a high-priority message (step "I"). High priority calls may include calls from emergency personnel, or from persons previously identified as high-priority by the user. Such functionality may be pre-programmed into the phone, or may be activated within controller 102 by caller ID information provided along with the incoming call. In the event of a high-priority incoming call, processing passes automatically from state 206 to state 208, and the first call is placed into a holding queue as appropriate.

The phone queue associated with state 208 is any stack, queue or other structure capable of maintaining connections with one or more phones 103, 110, 112 while another call is active on the vehicle audio system. The multiple calls placed in the queue may emanate from one or more phones within system 100, or from any combination of the various phones as appropriate.

If a queued call experiences a hangup, disconnect or timeout, the call may be removed from the queue (path "K") as appropriate. Various embodiments may remove queued calls automatically after a desired period of time elapses, although such functionality is not required in all embodiments. If only a single call is present in the queue and that call is subsequently disconnected, processing may pass automatically to state 206 (path "L") to reflect that only one active call is present within the system. If calls remain in the queue after the active call becomes inactive (path "M") or is ended by the user (path "N"), the first call in the queue becomes the active call, and the priority of the remaining queued calls is appropriately adjusted. If the user indicates a desire to switch the active call to a queued call without terminating the active call (e.g. by depressing a "FLASH" or "SEND/RECEIVE" button 118), the active call is placed in the queue and the first queued call is placed on audio system 100 (path "O"). Alternatively, the user may elect to originate a call on any phone while another call is active (path "P"), in which case the presently active call is enqueued at state 208, and the new call becomes the active call.

If additional calls are received while other calls remain in the queue, processing continues at state 212 (path "Q") to handle the incoming call. The user is appropriately notified of the incoming call via an audible and/or visual alert. If the user elects to accept the call (e.g. by depressing the "ANSWER/SEND" button 118), the incoming call becomes the active call and the previous active call is added to the queue (path "R" to state 208). If the user elects to end the present call (e.g. by depressing "END" button 122), the active call is terminated and the incoming call becomes the active call on audio system 100 (path "S"). If the user rejects the incoming call (e.g. by depressing "REJECT" button 120), the incoming call is terminated and audio system 100 continues to process the active call (path "T").

After all of the calls in the queue (state 208) are completed, processing suitably returns to state 206 for completion of the single remaining active call (path "L"). When the last active call is complete, the user depresses "END" button 122 to terminate the call, and processing returns to the original inactive state 202 (path "X").

FIG. 3 is a more detailed state diagram of an exemplary vehicle audio system 300 capable of simultaneously processing telephone calls using multiple phones. In the exemplary embodiment shown in FIG. 3, system 300 communicates using a portable cellular/wireless phone coupled to audio system 300 via a Bluetooth or other wireless connection, as well as an onboard phone such as an OnStar telephone. System 300 also includes an optional voice recording function that allows the user to dictate memos, reminders or the like using the vehicle microphone. Recorded data may be stored in a digital memory and/or may be played back through audio system 300 as appropriate. Each of the system states shown in FIG. 3 may be implemented using software instructions stored in any digital storage medium (e.g. a digital memory) and executing in controller 102 (FIG. 1) or on any other processor within vehicle 101.

With reference now to FIG. 3, audio system 300 suitably begins in state 308 with no active calls. When in state 308, audio system 300 may process music or other audio content from any source such as a radio tuner, compact disk, satellite radio or the like. The user is able to turn off system 300 at any time by actuating a button, switch or the like to place system 300 in powered-down state 310 as appropriate.

System 300 suitably discovers portable phones communicating with system 300 in any manner (state 302). In one embodiment, system 300 suitably polls a wireless environment at system startup and/or at regular intervals to identify eligible phones within the transmission area. Exemplary wireless polling and connection schemes are provided in the various wireless specifications such as the Bluetooth specification described above, or may be implemented in any other manner. Phones coupled to system 300 via cradles, cables and/or other hardware interfaces may also be discovered in system 302 as appropriate. The term "portable phone" as used in this discussion of FIG. 3 typically refers to a portable cellular/wireless phone that is coupled to vehicle audio system 300 using a wireless or hardware interface such as interfaces 104 and/or 108 shown in FIG. 1.

The user may place or receive calls via any phone coupled to system 302 using the vehicle audio system. That is, audio from the phone call is presented to the user via the audio system loudspeakers, and the user's voice is provided to the phone from a microphone placed in the passenger compartment of the vehicle. Users suitably manage calls and other functions of system 300 using any interface such as interface 114 described above in conjunction with FIG. 1. Alternatively, calls may be managed with voice commands received at a voice recognition system, or the like. Various embodiments of system 300 also incorporate a voice recording function 304 that may be accessed using the user interface.

As a call arrives on any of the phones (e.g. state 314 shows a call arriving via the wireless interface), system 300 provides the user with a visual and/or audible prompt identifying the incoming call. Any identifying or priority information associated with the call (e.g. caller ID data) may also be provided in various embodiments. If the user accepts the call (e.g. by pressing a "SEND/ACCEPT" button 118), the call is provided on the audio system. State 320 shows an active call from a portable phone, for example, and state 324 shows an active call using the onboard telephony system.

If calls arrive on any phone connected to system 300 while a call on another phone is active, the user may be notified of the incoming call and/or prompted to process the incoming call as described above in conjunction with FIG. 2. If the user desires to switch from a call on the portable phone to a call on the onboard phone (state 316), for example, or vice versa (state 318), the user depresses the "ACCEPT/SEND" button 118 or the like to activate the desired call on the vehicle audio system. Alternatively, the user may elect to end the active call and/or reject the incoming call, as discussed above.

If additional incoming calls are received while another call remains active, the incoming calls may be placed in a queue or otherwise processed as appropriate. If either the portable phone and/or the onboard phone system provide call waiting functionality, for example, subsequent calls arriving via the active phone connection may be handled using conventional call waiting processes. The active phone may accept awaiting calls in response to the user depressing a "FLASH" or similar button provided as part of interface 114, for example. Alternatively, awaiting calls may be placed in a queue (state 322) as described above in conjunction with FIG. 2. As the user completes the active call, system 300 may check the call waiting queue (state 306) to activate any awaiting calls as appropriate.

Various alternate embodiments of system 300 may provide additional functionality. Voice recording sessions (state 304) may be processed as incoming or outgoing calls, for example, in that they may be queued and sequentially processed along with other actual phone calls (state 326). Such functionality may be useful if a user wishes to dictate a reminder for an appointment, action item or other thought resulting from a telephone call. Private mode functionality (state 312) may also be provided whereby particular calls sent or received on a portable phone are not provided through the vehicle audio system to preserve privacy of certain conversations. Further, system 300 may provide priority emergency services as appropriate (state 328). In such embodiments, outgoing emergency communications (e.g. calls to medical personnel) may be automatically activated on system 300 when warranted (e.g. in the event of a collision or other emergency), pre-empting other calls and/or voice recording sessions that may have been previously active. Other features and functionalities may be present in widely-varying alternate embodiments.

While exemplary embodiments have been presented in the foregoing detailed description of the invention, it should be appreciated that a vast number of equivalent variations exist. It should also be appreciated that these exemplary embodiments are only examples, and are not intended to limit the scope, applicability, or configuration of the invention in any way. Rather, the foregoing detailed description will provide a convenient road map for implementing an exemplary embodiment of the invention. Various changes may be made in the function and arrangement of elements described in an exemplary embodiment without departing from the scope of the invention as set forth in the appended claims and their legal equivalents.

The invention claimed is:

1. A method of processing telephone calls using a first telephone and a second telephone each located within a vehicle and each interoperating with a vehicle audio system that is also located within the vehicle, the method comprising the steps of:

providing a first call handled by the first telephone to a user via the vehicle audio system;

notifying the user of a second call handled by the second telephone while the first call is active;

processing an instruction from the user to suspend the first call and to provide the second call on the vehicle audio system, wherein the first call is placed in a hold queue within the vehicle audio system without terminating the first call;

maintaining a connection between the hold queue in the vehicle audio system and the first telephone while the second call remains active to thereby continue the first call even though the first and second calls are handled by different telephones that are each located within the vehicle; and in response to a subsequent instruction from the user, restoring the first call from the hold queue and again providing the first call to the user via the vehicle audio system.

2. The method of claim 1 wherein the notifying step comprises providing an audible prompt using the vehicle audio system.

3. The method of claim 2 wherein the audible prompt comprises an indication of the priority of the second call.

4. The method of claim 1 wherein the processing step comprises placing the first call on hold while the user accepts the second call.

5. The method of claim 1 wherein the providing step comprises routing audio information from the first telephone to the vehicle audio system, and routing output from a vehicle microphone to an input of the first telephone.

6. The method of claim 5 wherein the processing step comprises routing audio information from the second telephone to the vehicle audio system and routing output from a vehicle microphone to an input of the second telephone in response to the instruction from the user to suspend the first call.

7. The method of claim 1 wherein the subsequent instruction from the user comprises an instruction to terminate the second call.

8. The method of claim 1 wherein the hold queue is further configured to maintain connections with any of the plurality of telephone sources to thereby continue calls received from any one of the plurality of telephone sources while calls from any other one of the plurality of telephone sources are active.

9. The method of claim 1 wherein the first call is placed between the first telephone and a first remote communicant external to the vehicle.

10. The method of claim 9 wherein the second call is placed between the second telephone and a second remote communicant external to the vehicle.

11. A vehicle audio system located within a vehicle for processing telephone calls using a first telephone and a second telephone each located within the vehicle, the system comprising:

means for providing a first call handled by the first telephone to a user via the vehicle audio system;

means for notifying the user of a second call handled by the second telephone while the first call remains active;

means for processing an instruction from the user to suspend the first call and to provide the second call on the vehicle audio system, wherein the first call is placed in a hold queue within the vehicle audio system without terminating the first call;

means for maintaining a connection between the hold queue in the vehicle audio system and the first telephone while the second call remains active to thereby continue the first call even though the first and second calls are handled by different telephones that are each located within the vehicle; and means for restoring the first call from the hold queue and for again providing the first call to the user via the vehicle audio system in response to a subsequent instruction from the user.

12. An audio system for processing telephone calls using a first telephone and a second telephone that are each located within a vehicle, the system comprising at least one audio speaker, a user interface and a controller communicating with each of the first and second telephones, wherein the controller is configured to provide a first call from a first telephone to a user via the at least one audio speaker, to notify the user of a second call handled by the second telephone while the first call is active, and to process an instruction received from the user at the user interface to suspend the first call and accept the second call over the at least one audio speaker, wherein the first call is suspended by placing the first call in a hold queue without terminating the first call, and wherein the first call is restored from the hold queue in response to a subsequent instruction from the user and is again provided to the user via the at least one audio speaker, wherein the hold queue is configured to maintain a connection with the first telephone while the second call remains active to thereby continue the first call even though the first and second calls are handled by different telephones each located within the vehicle.

13. The audio system of claim 12 further comprising a first interface to the first telephone and a second interface to the second telephone.

14. The audio system of claim 13 wherein the first telephone is a portable wireless telephone and the first interface is a wireless interface to the portable wireless telephone.

15. The audio system of claim 14 wherein the second telephone is an onboard satellite telephony system located within the vehicle.

16. The audio system of claim 15 wherein the processor is further configured to override any calls on the first telephone to automatically place a call on the second telephone in the event of an emergency.

17. The audio system of claim 14 wherein the wireless interface is a Bluetooth interface.

18. The audio system of claim 14 wherein the controller is further configured to place the first call into a private mode on the first telephone when instructed by the user.

19. The audio system of claim 12 wherein the controller is further configured to place the second call into a queue if the user continues the first call.

20. The audio system of claim 12 further comprising a voice recording subsystem in communication with the controller.

21. The audio system of claim 12 wherein the user interface comprises a SEND button, a REJECT button, and an END button.

* * * * *